Jan. 1, 1935.  J. C. IRELAND  1,986,398
CAMERA CONTROL
Filed Oct. 7, 1933  3 Sheets-Sheet 1
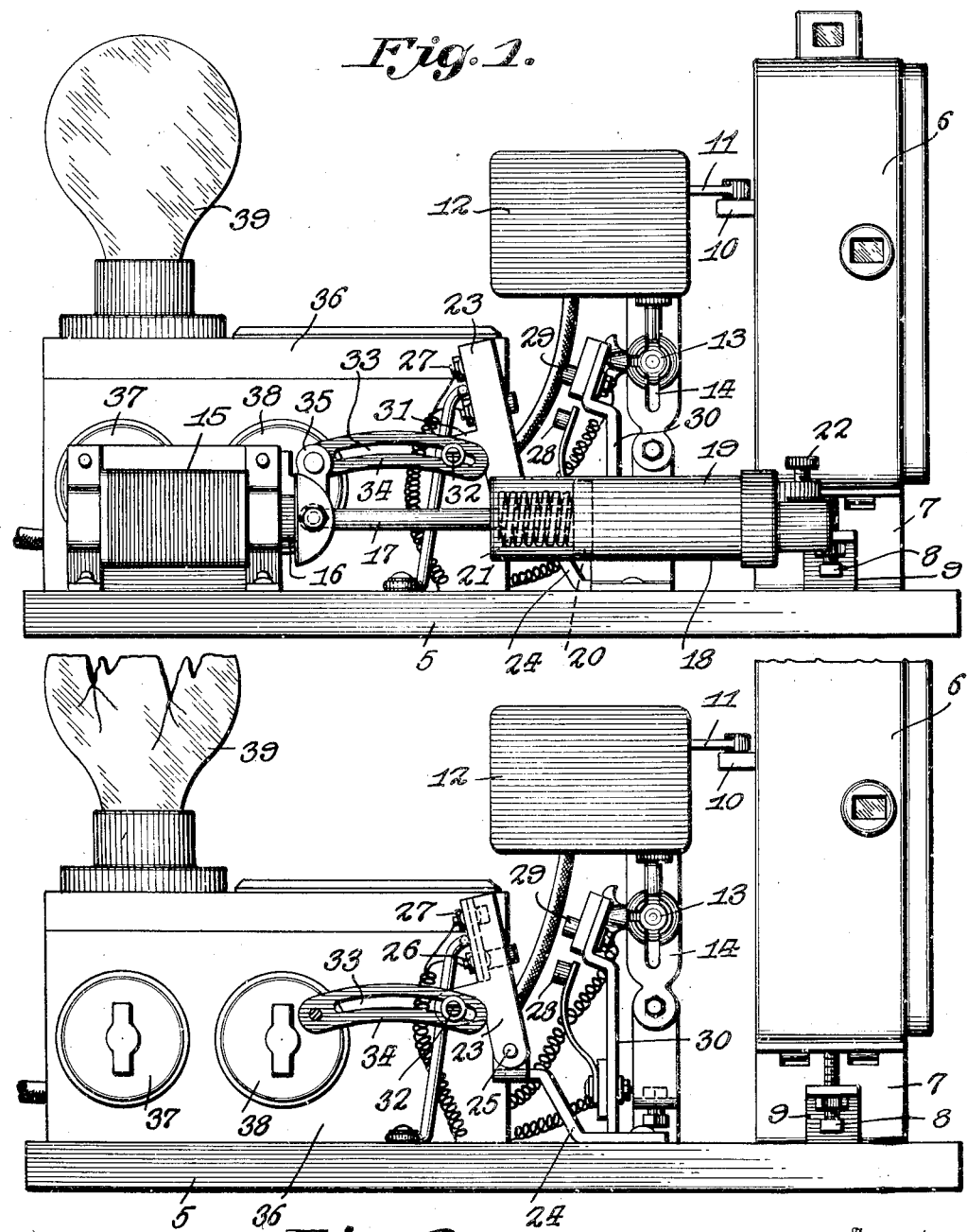
Inventor
Joseph C. Ireland Jan. 1, 1935.    J. C. IRELAND    1,986,398
CAMERA CONTROL
Filed Oct. 7, 1933    3 Sheets-Sheet 2

Inventor
Joseph C. Ireland

Jan. 1, 1935.  J. C. IRELAND  1,986,398
CAMERA CONTROL
Filed Oct. 7, 1933  3 Sheets-Sheet 3

Inventor
Joseph C. Ireland

Patented Jan. 1, 1935

1,986,398

UNITED STATES PATENT OFFICE 1,986,398

CAMERA CONTROL

Joseph C. Ireland, Stillwater, Okla.

Application October 7, 1933, Serial No. 692,567

3 Claims. (Cl. 240—2)

My invention relates to an automatic control for motion picture cameras.

The primary object of the invention is to provide an automatic control for motion picture cameras which will operate the camera at predetermined intervals, whereby the slow growth of plants and development of other objects may be photographed with accuracy and ease.

Another object of the invention is to provide a mechanism of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevational view of the automatic control mechanism, Fig. 2 is a similar view with certain parts removed therefrom, Fig. 3 is a top plan view of the apparatus.

Figure 3:
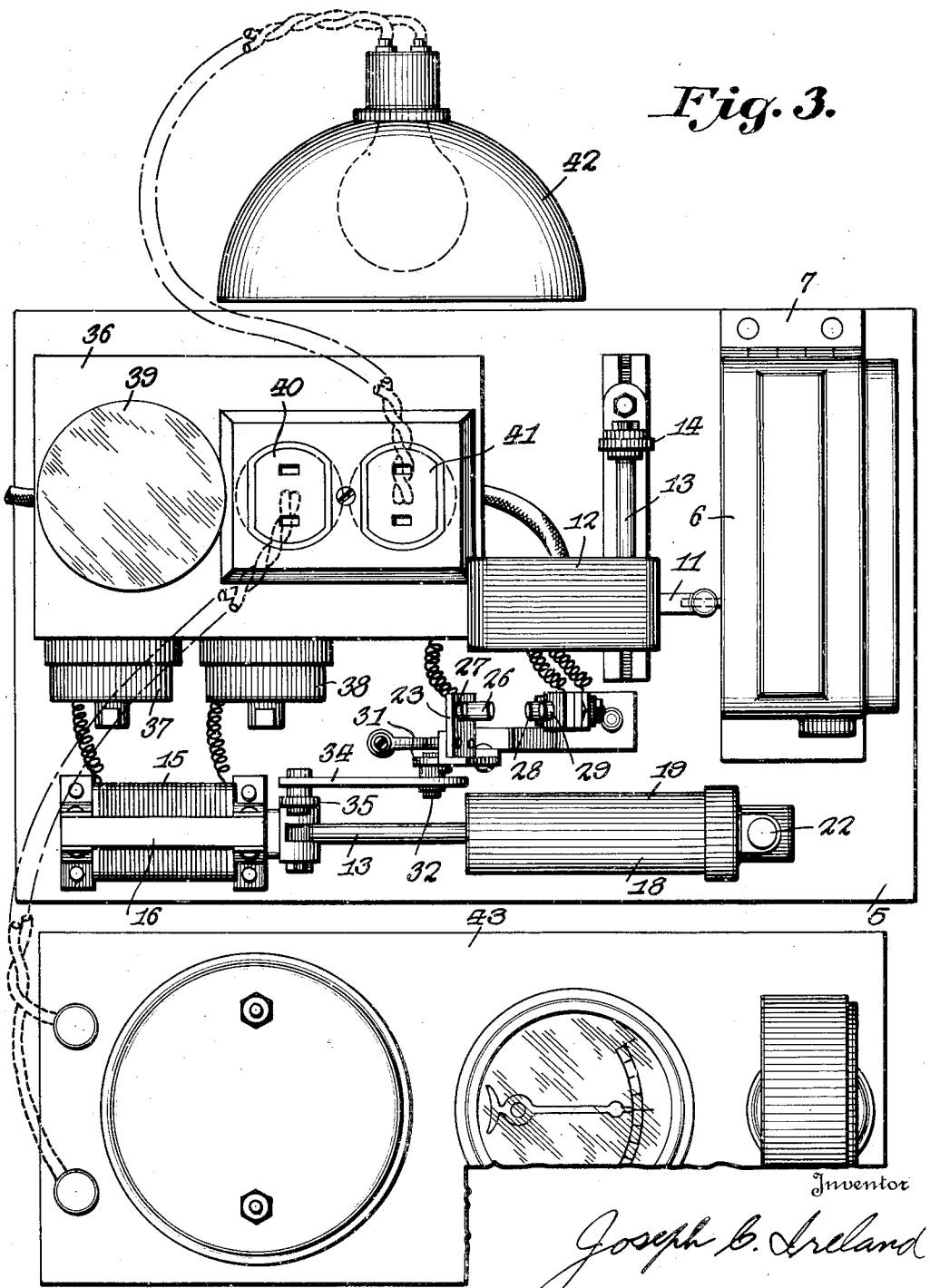
Figure 4:
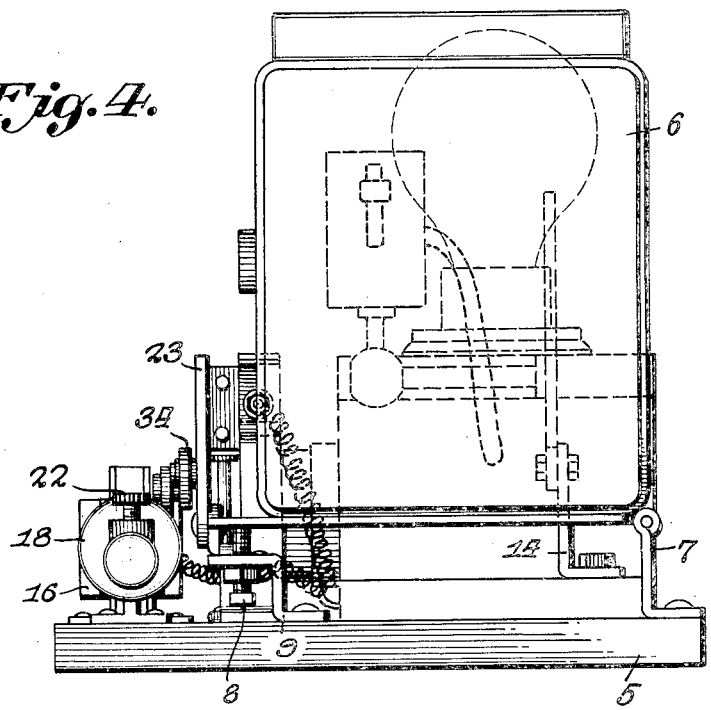
Fig. 4 is an end view of the same.

In the drawings, wherein for the purpose of illustration, I have shown a preferred embodiment of my invention, the apparatus is mounted on a base board 5 and consists of a standard motion picture camera 6 having its rear lower edge hingedly connected to a bracket 7, extending upwardly from the base and the forward end of the camera is supported by the adjusting screw 8 mounted in the bracket 9. The camera is provided with the usual control lever 10 projecting from the side thereof and disposed above the lever 10 is the end of the armature 11 of an electro-magnet 12. The electro-magnet is adjustably mounted on the rod 13 which in turn is adjustably mounted in the bracket 14 attached to the base, whereby the electro-magnet may be readily adjusted to position the armature in proper relation with respect to the camera control lever. A solenoid 15 is mounted on the base having a core 16 mounted to reciprocate therein and one end of the core is connected to the piston rod 17 of the dashpot 18. The dashpot includes a cylinder 19 having a piston 20 mounted to reciprocate therein, which is connected to the piston rod 17. An expansion spring 21 is mounted on the piston rod 17 within the cylinder for moving the piston towards the outer end of the cylinder and a needle valve 22 adjacent the end of the cylinder controls the release of air from the cylinder, thereby regulating the speed at which the piston moves under the action of the spring 21. A movable switch arm 23 is pivotally mounted on the bracket 24, as at 25, having contacts 26 and 27, for engagement with the stationary contacts 28 and 29 carried by the bracket 30. The switch arm 23 is provided with an extension 31 having a pin 32 projecting therefrom which is movable in the slot 33 of the trip arm 34, having one end pivotally attached to the bracket 35 mounted on the piston rod 17 and upon movement of the piston rod the switch arm is moved to open or closed positions. A switch box 36 is mounted on the base having two control switches 37 and 38 mounted in the side thereof. A resistance lamp 39 is mounted in the top of the box and two outlet sockets 40 and 41 are mounted in the top, one of the sockets being provided for connecting a floodlight 42 in the circuit and the other socket being provided for connecting a Weston photronic relay 43 to the circuit when desired.

Figure 5:
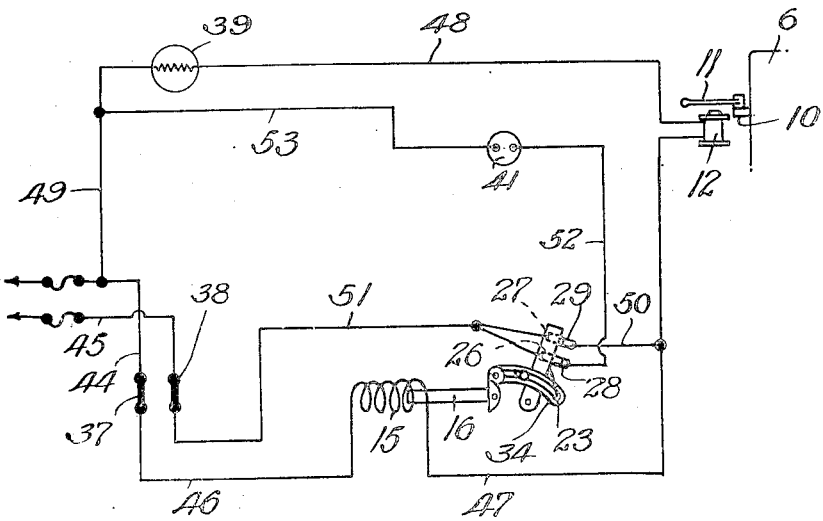
Fig. 5 is a diagram of the electrical wiring.

The wiring diagram of the circuit is shown in Fig. 5, and includes the main line wires 44 and 45 connected to a 110 volt A. C. circuit. The main line wires 44 and 45 are connected to the switches 37 and 38 and the switch 37 through wire 46 is connected to the solenoid 15, which through wire 47 connects with the electromagnet 12. The wire 48 connects the electromagnet with the resistance lamp 39 and the lamp in turn is connected to the main line wire 44, through wire 49. A branch wire 50 connects the stationary contact 29 with the wire 47 and the contacts of the movable switch arm 23 are connected with the switch 38, through wire 51. The socket 41 for the floodlight has connection with the contact 28, through wire 52 and with the wire 49, through wire 53.

In operation, the dashpot 18 normally holds the switch arm 23 in closed position, so that upon closing switches 37 and 38, the current flows to the electro-magnet 12 and floodlight 42, thus actuating the camera. At the same time, the solenoid 15 is energized, retracting the core 16 which through the trip arm 34 opens the switch 23, breaking the circuits to the electro-magnet and floodlight and also the solenoid. The dashpot 18 through its connection with the core 16 of the solenoid 15 controls the closing of the switch 23, to again complete the circuits to the electro-magnet, floodlight and solenoid and as long as the switches 37 and 38 remain closed the camera, floodlight and solenoid will be periodically actuated. When the Weston photronic relay 43 is used to control the operation of the camera and floodlight, there is no need to use the solenoid 15, and the switch 23 remains closed and switches 37 and 38 are both opened. Upon tripping of the relay 43, the circuits to the electro-magnet and floodlight are closed and the camera is actuated.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. An automatic camera control including a camera, an electro-magnet for actuating said camera, a floodlight in circuit with said electro-magnet, a solenoid in circuit with said electro-magnet and floodlight, a switch for controlling the circuits, operably connected with said solenoid so as to be opened thereby when the solenoid is energized, a dashpot connected with said solenoid to retard the closing of said switch and means to return the switch to closed position.

2. An automatic camera control including a camera, an electro-magnet for actuating said camera, a floodlight, a solenoid, an electric circuit for said electro-magnet, floodlight and solenoid, a switch interposed in said circuit operably connected with said solenoid so as to be opened thereby when the solenoid is energized, a dashpot connected with said solenoid to retard the closing of said switch and means to return the switch to closed position.

3. An automatic camera control including a camera, an electro-magnet for actuating said camera, a solenoid, an electric circuit for said electro-magnet and solenoid, a switch interposed in said circuit, said switch being operably connected with the core of said solenoid whereby the switch is opened when the solenoid is energized, a dashpot connected with the core of the solenoid to retard the closing of said switch and means to return the switch to closed position.

JOSEPH C. IRELAND.